2,974,142
MORPHINAN DERIVATIVES

André Grüssner, Joseph Hellerbach, and Otto Schnider, Basel, Switzerland, assignors to Hoffmann-La Roche Inc., Nutley, N.J., a corporation of New Jersey No Drawing. Filed May 5, 1958, Ser. No. 732,827

Claims priority, application Switzerland May 9, 1957

12 Claims. (Cl. 260—285)

This invention relates to new morphinan derivatives and to a method for synthesizing such compounds. More particularly, the invention relates to substituted morphinans represented by the following structural formula (I)
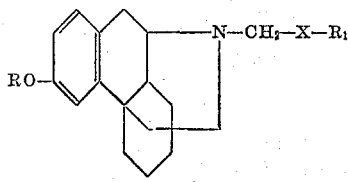

wherein R represents hydrogen, lower alkyl or lower acyl, $R_1$ represents phenyl or a substituted phenyl group wherein the substituent is hydroxy, lower alkyl, lower alkoxy, lower alkoxy-lower alkylene, lower alkylenedioxy, lower alkylmercapto, nitro, amino, lower alkylamino, dilower alkylamino or lower acyl amino and X represents carbonyl or hydroxymethylene, and to salts thereof.

Lower alkyl groups represented by R in Formula I above are alkyl groups which form lower alkyl ethers with the hydroxy group in the 3-position of the morphinan ring, e.g. methyl, ethyl, propyl, isopropyl, butyl, isobutyl, amyl and the like. Lower acyl groups represented by R in the formula represent the acyl radical of lower fatty acids (i.e. lower alkanoic acids) which may be used to esterify the hydroxy group in the 3-position of the morphinan ring, e.g. acetyl, propionyl, butyryl, and the like. They may be alternatively referred to as lower alkanoyl groups.

Lower alkyl groups which form part of the substituted phenyl groups represented by $R_1$ in Formula I include lower alkyl groups such as those illustrated above. Thus substituents such as the following may be attached to the phenyl group to form substituted phenyl radicals represented by $R_1$: methyl, ethyl, propyl, butyl and the like, methoxy, ethoxy, propoxy, butoxy and the like, methylmercapto, ethylmercapto, propylmercapto, and the like, methylamino, ethylamino, dimethylamino, diethylamino, and the like.

Lower alkylenedioxy groups which may also constitute substituents on the phenyl group represented by $R_1$ are cyclic, divalent oxygen containing groups wherein one oxygen atom is attached to each of two positions of the phenyl ring and the two oxygens are linked to each other through a lower alkylene linkage, for example, methylenedioxy, ethylenedioxy, etc.

Lower acyl groups which form part of the substituted phenyl radicals are lower fatty acid residues as described above in connection with the symbol R. Lower alkylene refers to divalent, polymethylene hydrocarbon groups having up to about seven carbon atoms.

The phenyl group may bear more than one substituent as illustrated by Example 5 below.

X in Formula I above represents the carbonyl group, i.e.

or hydroxymethylene, i.e.

A preferred group of compounds within the class defined above constitute those morphinans wherein R represents hydrogen, X represents carbonyl and R represents a member of the group consisting of phenyl, p-methoxyphenyl, methylenedioxy-phenyl, nitro-methoxy-phenyl and methylmercapto. A second preferred group of compounds constitutes those wherein R represents hydrogen, X represents hydroxymethylene and $R_1$ represents phenyl or methoxyphenyl. The compound wherein R in Formula I represents methyl, X represents carbonyl and $R_1$ represents methylenedioxy-phenyl is also a preferred member.

The process for synthesizing compounds having the Formula I above constitutes another aspect of this invention. In order to prepare compounds having the Formula I above, 3-hydroxy-morphinan or a derivative thereof wherein the hydroxy group is etherified or esterified by means of a lower alkyl group or lower acyl group, respectively, is reacted with a phenacyl halide having the general formula (II) $\quad R_1-CO-CH_2-Y$ wherein $R_1$ has the same significance described above in connection with Formula I and Y represents a chloro, bromo or iodo atom.

Examples of phenacyl halides which may be used to react with 3-hydroxymorphinan or its ether or ester include for example, phenacyl bromide, p-methoxy-phenacyl bromide, 3,4-methylenedioxy phenacyl bromide, p-nitrophenacyl bromide, m-nitro-p-methoxyphenacyl bromide and p-methylmercapto phenacyl bromide. The reaction of the morphinan with the phenacyl halide is preferably carried out in an inert organic solvent such as dimethylformamide or dioxane, and in the presence of an acid binding agent such as an alkali metal carbonate, e.g. potassium carbonate.

The product of the reaction of 3-hydroxy-morphinan or its ether or ester with a phenacyl halide is a compound of Formula I wherein X is a carbonyl group. The carbonyl group may then, if desired, be reduced to the hydroxymethylene group.

The reduction of the carbonyl group may be effected by treating the N-phenacyl-morphinan with a conventional reducing agent. Preferably the reduction is accomplished catalytically in the presence of a catalyst such as platinum, palladium or nickel in solution, e.g. in alcohol. The catalyst may be supported on a carrier such as carbon, or an alkaline earth metal carbonate such as calcium carbonate, barium carbonate or strontium carbonate. Alternatively, the carbonyl group may be reduced by treatment with a reducing agent such as an alkali metal aluminum hydride, e.g. lithium aluminum hydride in an organic solvent such as ether or tetrahydrofuran.

The hydroxy group in the 3-position of the morphinan ring may be etherified or esterified, if desired, either prior to the reaction with the phenacyl halide or later in the process. This may be effected by treatment with an agent such as phenyl-trialkyl-ammonium hydroxide, e.g. phenyl-trimethyl-ammonium hydroxide, a lower acyl halide, e.g. acetyl chloride or a lower fatty acid anhydride, e.g. acetic anhydride.

As starting material, racemic, as well as optically active, 3-hydroxy-morphinan can be used. These may be prepared according to Belgian Patent No. 533,046. The products of this invention occur in optically active forms as well as in racemic mixtures thereof and these are all within the scope of the present invention.

The products obtained according to this invention are crystalline or resinous compounds which are generally soluble in conventional organic solvents and difficultly soluble in water.

The compounds of this invention form acid addition salts with organic and inorganic acids. Illustrative acid addition salts include the hydrohalides, such as hydrochloride, hydrobromide, hydroiodide, etc., sulfate, phosphate, nitrate, tartrate, salicylate, benzoate, malate, citrate, acetate, etc. The salts dissolve in water and in lower aliphatic alcohols but are difficultly soluble in hydrocarbons and ethers.

The novel compounds of this invention exhibit activity on the central nervous system; they are useful as antitussives. The levo-rotatory compounds and racemic mixtures containing them are also useful as analgesics. These compounds or their pharmaceutically acceptable acid addition salts may be administered orally or parenterally in conventional forms such as tablets, capsules, elixirs, injectables, etc. by incorporating a therapeutic dose in a conventional carrier and, if desired, adding excipients according to accepted pharmaceutical practice.

The following examples are illustrative of the invention. All temperatures are in degrees centigrade.

*Example 1*

12.15 g. (-)-3-hydroxy-morphinan were dissolved in 150 cc. dimethylformamide and stirred for 30 minutes with 11 g. of phenacyl bromide in the presence of 7.3 g. of potassium carbonate. The temperature of the reaction mixture rose and carbon dioxide was evolved. The mixture was stirred for another 15 minutes at 50° and the solution was then separated from the inorganic salts by filtering under suction. After concentrating the filtrate, (-)-3-hydroxy-N-phenacyl-morphinan was recrystallized from alcohol, M.P. 173-175°. The base was treated with alcoholic-HCl to obtain (-)-3-hydroxy-N-phenacyl-morphinan hydrochloride, M.P. 278-279° (crystallized from alcohol-ether); $[\alpha]_D^{20} = -72°$ (c.=1.02 in methanol).

*Example 2*

6.07 g. (-)-3-hydroxy-morphinan were dissolved in 75 cc. dimethylformamide and stirred for 20 hours at room temperature with 6.3 g. p-methoxy-phenacyl bromide in the presence of 3.65 g. of potassium carbonate. After working up the reaction product as described in Example 1, there was obtained (-)-3-hydroxy-N-(p-methoxy-phenacyl)morphinan. The base was converted to the hydrochloride by treatment with alcoholic-HCl. The (-)-3-hydroxy-N-(p-methoxy-phenacyl)morphinan hydrochloride was recrystallized from dimethylformamide-acetone, M.P. 275-280°; $[\alpha]_D^{20} = -81.5°$ (c.=1.05 in methanol).

*Example 3*

12.15 g. (-)-3-hydroxy-morphinan, 13.3 g. 3,4-methylenedioxy-phenacyl bromide and 8 g. of potassium carbonate in 150 cc. of dimethylformamide were boiled for five minutes. After working up the reaction product as described in Example 1, there was obtained (-)-3-hydroxy-N-(3,4-methylenedioxy-phenacyl)morphinan, M.P. 214-216° (crystallized from dioxane). The base was converted to the hydrobromide by treatment with a solution of hydrogen bromide, M.P. 250-251° (crystallized from dilute alcohol); $[\alpha]_D^{20} = -77.77°$ (c.=1.264 in methanol).

*Example 4*

(-) - 3 - methoxy - N - (3,4 - methylenedioxy - phenacyl)morphinan was obtained from (-)-3-methoxy-morphinan and 3,4-methylenedioxy-phenacyl bromide according to the method described in Example 3. The base was treated with tartaric acid to obtain the tartrate, M.P. 188-189° (crystallized from alcohol); $[\alpha]_D^{20} = -57.8°$ (c.=1.539 in methanol).

*Example 5*

(-) - 3 - hydroxy - N - (3 - nitro - 4 - methoxy - phenacyl)morphinan was obtained from (-)-3-hydroxy-morphinan and 3-nitro-4-methoxy-phenacyl bromide according to the procedure described in Example 1. The hydrochloride, obtained by treating the base with alcoholic-HCl, melted at 202°; $[\alpha]_D^{20} = -74.9$ (c.=1.036 in methanol).

*Example 6*

4.8 g. (-)-3-hydroxy-morphinan, 4.8 g. p-methylmercapto-phenacyl bromide and 2.6 g. potassium carbonate in 150 cc. dimethyl-formamide were stirred at room temperature overnight and the mixture was then diluted with water. The base, (-)-3-hydroxy-N-(p-methylmercaptophenacyl)morphinan, was extracted with ether and, after removal from the ether, was crystallized from acetone, M.P.185°. The base was converted to the hydrochloride by treatment with HCl solution, M.P. 212-213° (crystallized from alcohol).

*Example 7*

2 g. of (-)-3-hydroxy-N-phenacyl-morphinan in 100 cc. of methanol were hydrogenated in the presence of 5% palladium-carbon until one mol of hydrogen was absorbed. After separating the catalyst by filtration, the filtrate was concentrated. The concentrate, comprising (-) - 3 - hydroxy - N - (2 - hydroxy - 2 - phenylethyl)morphinan, was treated with alcoholic-HCl to obtain (-)-3-hydroxy-N-(2-hydroxy-2-phenylethyl)morphinan hydrochloride, M.P. 244-245° (crystallized from alcohol-ether); $[\alpha]_D^{20} = -70.06°$ (c.=1.024 in methanol).

(-)-3-hydroxy-N-phenacyl-morphinan was reduced with lithium aluminum hydride to obtain the same product, (-)-3-hydroxy-N-(2-hydroxy - 2-phenylethyl)morphinan.

*Example 8*

(-)-3-hydroxy-N-[2-hydroxy - 2 - (p-methoxyphenyl)ethyl]morphinan was obtained by hydrogenating (-)-3-hydroxy - N - (p-methoxyphenacyl)morphinan according to the method described in the first paragraph of Example 7. The base was treated with alcoholic-HCl to obtain the hydrochloride, M.P. 234-235°; $[\alpha]_D^{20} = -86.02°$ (c.=0.959 in methanol).

(-)-3-hydroxy - N - (p-methoxyphenacyl)-morphinan was reduced within lithium lauminum hydride to obtain the same product, (-)-3-hydroxy-N-[2-hydroxy-2-(p-methoxyphenyl)ethyl]-morphinan.

We claim:

1. A compound selected from the group consisting of those represented by the formula

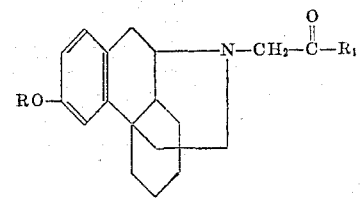

wherein R represents a member of the group consisting of hydrogen, lower alkyl and lower alkanoyl and $R_1$ represents a member of the group consisting of phenyl, hydroxyphenyl, lower alkylphenyl, lower alkoxyphenyl, lower alkoxy-lower alkylenephenyl, lower alkylenedioxyphenyl, lower alkylmercaptophenyl, nitrophenyl, aminophenyl, lower alkylaminophenyl, dilower alkylaminophenyl and lower alkanoyl-aminophenyl, and pharmaceutically acceptable acid addition salts thereof.

2. 3-hydroxy-N-phenacyl-morphinan.

3. 3-hydroxy-N-(p-methoxy-phenacyl)morphinan.

4. 3-hydroxy - N - (3,4-methylenedioxy-phenacyl)morphinan.

5. 3-methoxy - N - (3,4-methylenedioxy-phenacyl)morphinan.
6. 3-hydroxy - N - (3-nitro-4-methoxy-phenacyl)morphinan.
7. 3-hydroxy - N - (p-methylmercapto-phenacyl)morphinan.
8. 3-hydroxy - N - (2 - hydroxy - 2 - phenylethyl)morphinan.
9. 3-hydroxy - N - [2-hydroxy-2-(p-methoxyphenyl)ethyl]morphinan.

10. A process for producing a compound having the formula

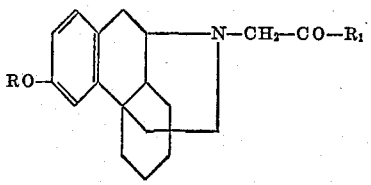

wherein R represents a member of the group consisting of hydrogen, lower alkyl and lower alkanoyl and $R_1$ represents a member of the group consisting of phenyl, hydroxyphenyl, lower alkylphenyl, lower alkoxyphenyl, lower alkoxy-lower alkylenephenyl, lower alkylenedioxyphenyl, lower alkylmercaptophenyl, nitrophenyl, aminophenyl, lower alkylaminophenyl, dilower alkylaminophenyl and lower alkanoyl-aminophenyl, which comprises reacting in an inert organic solvent at a temperature from about room temperature to the boiling temperature of the mixture in the presence of an acid binding agent a member of the group consisting of 3-hydroxy-morphinan, a lower alkyl ether thereof and a lower alkanoic acid ester thereof with a halide having the formula

wherein $R_1$ has the same significance as above and Y represents a halogen.

11. A process for producing a compound having the formula

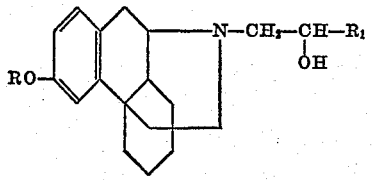

wherein R represents a member of the group consisting of hydrogen, lower alkyl and lower alkanoyl and $R_1$ represents a member of the group consisting of phenyl, hydroxyphenyl, lower alkylphenyl, lower alkoxyphenyl, lower alkoxy-lower alkylenephenyl, lower alkylenedioxyphenyl, lower alkylmercaptophenyl, nitrophenyl, aminophenyl, lower alkylaminophenyl, dilower alkylaminophenyl and lower alkanoyl-aminophenyl, which comprises reacting in an inert organic solvent at a temperature from about room temperature to the boiling temperature of the mixture in the presence of an acid binding agent a member of the group consisting of 3-hydroxy-morphinan, a lower alkyl ether thereof and a lower alkanoic acid ester thereof with a halide having the formula

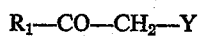

wherein $R_1$ has the same significance as above and Y represents a halogen to form a compound having the formula

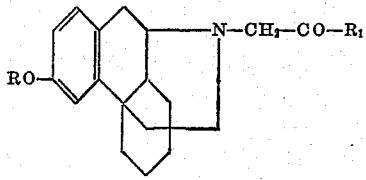

wherein R and $R_1$ each have the same significance as above and reducing the latter product.

12. A compound selected from the group consisting of those represented by the formula

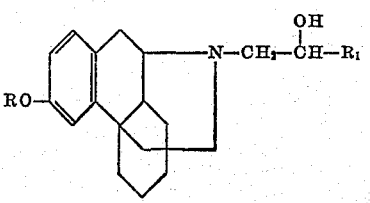

wherein R represents a member of the group consisting of hydrogen, lower alkyl and lower alkanoyl and $R_1$ represents a member of the group consisting of phenyl, hydroxyphenyl, lower alkylphenyl, lower alkoxyphenyl, lower alkoxy-lower alkylenephenyl, lower alkylenedioxyphenyl, lower alkylmercaptophenyl, nitrophenyl, aminophenyl, lower alkylaminophenyl, dilower alkylaminophenyl and lower alkanoyl-aminophenyl and pharmaceutically acceptable acid addition salts thereof.

References Cited in the file of this patent
UNITED STATES PATENTS 2,885,401    Grussner et al. _____ May 5, 1959

OTHER REFERENCES

Hellerbach et al.: Helv. Chim. Acta, vol. 39, pp. 429–440 (1956).